April 26, 1932.    F. N. LEASE    1,855,298

VEHICLE SIGNAL

Filed Aug. 16, 1926

INVENTOR.
F. N. LEASE.
BY
ATTORNEYS.

Patented Apr. 26, 1932

1,855,298

UNITED STATES PATENT OFFICE

FREDERICK N. LEASE, OF EL CERRITO, CALIFORNIA

VEHICLE SIGNAL

Application filed August 16, 1926. Serial No. 129,347.

The invention relates to improvements in vehicle signals and more particularly to signals affixed to the rear of an automobile for the purpose of apprising the driver of a following automobile, of the intention of the driver of the automobile, to which the signals are affixed, as to his control thereof.

One of the objects of the invention is to apprise the driver of an automobile following an automobile to which the indicating signals are attached, if the driver thereof is going to make a turn to either the right or left or whether he is going to slow up the speed of his car or come to a full stop.

A further object of the invention is to provide means by which the slow signal may be operated by a partial depression of the brake pedal and the stop signal may be operated by the complete depression of the clutch pedal in such manner as to instantly flash the signal from the rear of the car.

A still further object of the invention is to so locate the controls for the direction of turn indicating signals as to make it unnecessary for the driver of an automobile to remove his hands from the steering wheel in order to actuate the signals.

A still further object of the invention is to place the control for the signals on the steering wheel and in such position thereon as to bring the controls in close proximity to the thumb or fingers of the driver's hand at such time as the driver would naturally shift his hands on the rim of the steering wheel in order to turn it to alter his course of travel, thereby elimnating any danger of the driver's losing control of his car by removing his hands from the steering wheel for the purpose of operating the signal controls.

A still further object of the invention is to construct a device of the character indicated which is simple, inexpensive, and may be readily applied to any automobile.

Other objects and advantages will appear as the following specification, taken in connection with the drawings, which are made a part thereof, proceeds.

For a more comprehensive and fuller understanding of the invention, reference may now be had to the following specification taken together with the accompanying drawings in which like reference characters refer to like parts throughout the several figures of the drawings and in which.

Figure 1:
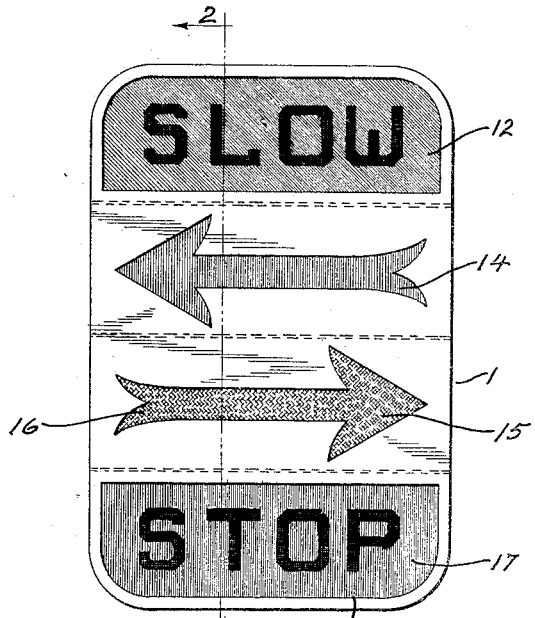
Figure 1 is a rear elevation of the casing enclosing the invention.
Figure 2:
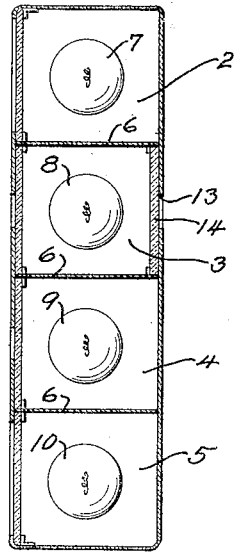
Figure 2 is a vertical section taken on line 2—2 of Fig. 1 showing the compartments containing electric lamps for illuminating the signals.
Figure 3:
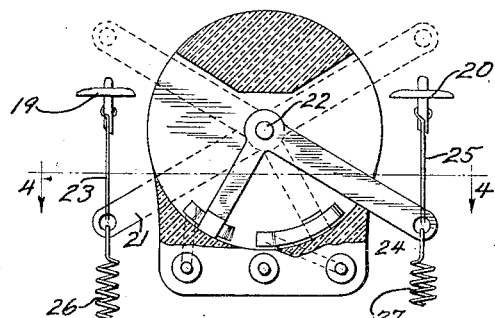
Figure 3 is a section taken on line 3—3 of Figure 4 viewed in the direction indicated by the arrows.
Figure 5:
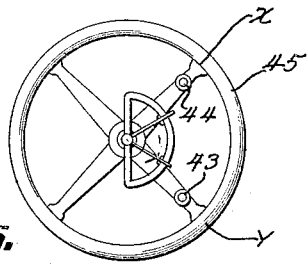
Figure 5 is a plan view of the steering wheel showing the controls for operating the direction signals mounted in the spokes thereof.
Figure 4:
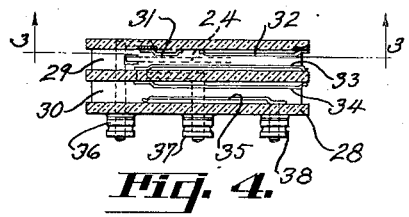
Figure 4 is a section taken on line 4—4 of Figure 3 showing the electrical contacts.
Figure 6:
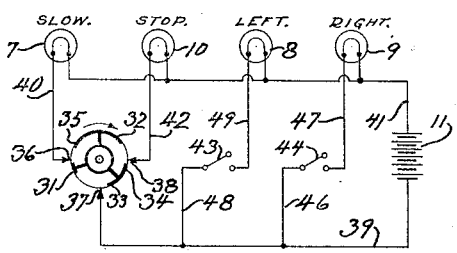
Figure 6 is a diagrammatic plan of the wiring of the electric circuit for controlling the signals.

The invention comprises a casing 10 having partitions 11, 12, and 13, extending transversely thereof resulting in the formation of compartments 14, 15, 16, and 17 therein, in which electric lamps 18 19, 20, and 21 are mounted in an electric circuit which is provided with contacts for energizing the lamps from a source of electric energy. The rear face of the casing 10 has a transparency 22 showing the word "Slow" and a transparency 23 showing the word "Stop". Intermediate the transparencies Slow and Stop are positioned two transparent arrows 24 and 25 pointing in opposite directions for the purpose of indicating when the driver of the automobile intends to turn to the right or the left. These indicating signals may be of any color or colors desired. The switch casing 26 is preferably made of an insulating material and has a partition 27 extending therethrough at its approximate center dividing the casing into compartments 28 and 29. The novel switch mechanism of the invention is shown in Figures 3 and 4 and diagrammatically in Figure 6, which energizes the lamps 18 and 21 and is disposed between the clutch pedal 30 and brake pedal 31. A bell crank contact 32 is pivotally mounted on shaft 33 and has a link connection 34 with the clutch pedal 30. Bell crank contact 35 is also pivoted on shaft 33 and is similarly connected to the brake pedal 31 by link 36. Springs 37 and 38 yieldingly hold the bell crank contact members in neutral position. Bell crank contacting member 32 is pivotally mounted upon the shaft 33 and within compartment 29 while bell crank contacting member 35 is mounted upon the shaft 33 within compartment 28. A binding post 45 is in circuit with contacting strip 44 and binding post 43 is in circuit with contacting strips 46 and 47 and a binding post 48 is in circuit with contact strips 49 and 50.

From the foregoing described construction, it will be readily observed that when the brake pedal 31 is slightly depressed for slowing up the motion of the automobile the switch arm 35 will establish contact with contacting strip 50 whereupon the current will pass from battery 51 through wire 52, contacting strip 50, switch arm 35, contact 44 wire 53 to lamp 18, wire 59 and thence to the battery 51 thereby illuminating the Slow signal. Should the brake pedal now be depressed to its limit of movement, the current will pass from battery 51 through wire 52, contact strip 50, switch arm 35 contact strip 46 to wire 54, to lamp 21, wire 59 and thence to battery 51 thereby illuminating the Stop signal. When the clutch pedal is depressed switch arm 32 will establish contact with contact strip 49 when the current will flow from battery 51 through wire 52, contact strip 49, switch arm 32, contact strip 47, wire 54 to lamp 21, wire 59 and thence to battery 51 thereby illuminating the word Stop. In the operation of an automobile the operator usually depresses the brake pedal before making a turn, which depression of the brake pedal, it will be readily seen from the foregoing disclosure, will instantly flash the Slow signal on the rear of the automobile. Should the driver of the automobile intend to stop, the further depression of the brake pedal to bring the automobile to a halt, would instantly flash the Stop signal. Contact buttons 55 and 56 mounted upon the spokes of the steering wheel 57 are provided for energizing lamps 19 and 20. When the automobile is being driven in a straight way direction the driver's right hand will naturally grip the rim of the steering wheel intermediate the spokes having the contacting buttons 55 and 56 mounted thereon and somewhat remote from the buttons, should the driver however, wish to turn to the right, for example, he would naturally shift his right hand upwardly toward the point X on the steering wheel 57 in the operation of turning the wheel. This position of the right hand will bring the thumb thereof, or the fingers in close proximity to contacting button 55 which can be readily and quickly depressed by the thumb or a finger of the right hand without the necessity of the driver removing his hand from the steering wheel which always tends toward an accident by the driver losing control of the car. The depressing of the contact button 55 closes the electric circuit which results in the flow of an electric current from the battery 51 through wire 52, wire 58, through switch 55 lamp 20 and thence back to the battery through wire 59 which results in the illumination of arrow 25. On wishing to turn to the left the driver will naturally move his right hand downwardly towards the point Y on the rim of the steering wheel 57 in order to properly grasp the steering wheel to throw it contra clock wise in order to accomplish the turn of the automobile to the left and will thereby have the thumb or a finger of the right hand in close proximity to contacting button 56 while as before still being able to keep complete control of the automobile. The depression of contacting button 56 causes the current to flow from the battery 51 through wires 52, wire 60 contact button 56, wire 61, and lamp 19, wire 59 back to the battery 51, thus illuminating the arrow 24. It will be readily seen that from the structure just described that the driver of an automobile can indicate by the arrows 24 and 25 when he is going to turn to the right or left thus giving warning to a following automobile. If desired the device may be placed upon an automobile in such position that it can be viewed from the rear or the front of the automobile upon which it is placed and to this end the arrows 24 and 25 are duplicated on the opposite side of the casing 10, that is to say, two arrows pointing in opposite directions on the front walls of the casing, and two on the rear, thus enabling the driver of the automobile to indicate not only to automobiles following him, but to those approaching him, the direction in which he is going to make a turn.

I am aware that various modifications and changes of the invention as described and illustrated may be made without departing from the scope of the invention or the scope of the appended claims which are intended to claim all patentable subject matter herein disclosed.

Having thus described my invention, what I claim is:

1. An electric switch comprising a switch casing having two compartments, a shaft passing through the compartments, a bell crank rotatable on the shaft in one of the compartments, spaced apart contacts concentric with the shaft in said compartment and lying in the path of movement of the bell-crank, means for rotating the bell-crank upon the shaft to cause it to successfully contact with the contacts, a bell crank rotatably mounted upon the shaft in the other of the compartments, and a contact lying in the path of the last named bell-crank.

2. An electric switch comprising a switch casing having a partition therein, a shaft extending through the partition and forming a terminal, a bell crank rotatably mounted upon the shaft and on one side of the partition, spaced apart contacts for contacting with one arm of the bell-crank, a bell crank rotatably mounted upon the shaft on the other side of the partition and a contact for contacting with the last named bell-crank.

3. An electric switch comprising a switch casing having a partition therein, a shaft extending through the partition, a bell crank switch-arm rotatably mounted upon the shaft on one side of the partition, spaced apart contacts concentric with the shaft and in the path of movement of the arm, a bell crank switch arm rotatably mounted on the shaft on the other side of the partition and a contact lying within the path of movement of the last named switch-arm.

4. An electric switch, in combination, a switch casing comprising spaced apart plates, one of said plates comprising a partition forming two compartments within said casing, a shaft extending centrally through said casing, a switch lever pivotally mounted on said shaft in each compartment, contacts secured to the spaced apart plates and in the path of movement of the switch levers.

5. An electric switch, in combination, a switch casing comprising three spaced apart plates, a shaft extending centrally through two of the plates, switch levers rotatably mounted on the shaft between said plates, spaced apart contacts secured to the plates and in the path of movement of the respective switch levers.

6. An electric switch, comprising a casing consisting of three spacedly related plates, switch arms pivotally mounted between said plates and having integral operating arms extending outwardly of said casing, the pivot for said arms comprising a terminal, resilient contacts adapted to cooperate with each of said switch arms, and a terminal for each of said contacts.

In testimony whereof I affix my signature.

FREDERICK N. LEASE.